(12) United States Patent
Bronson et al.

(10) Patent No.: US 7,957,939 B2
(45) Date of Patent: Jun. 7, 2011

(54) MAXIMUM ENTROPY SIGNAL DETECTION METHOD

(75) Inventors: Frazier Bronson, Branford, CT (US);
William Russ, East Hampton, CT (US)

(73) Assignee: Canberra Industries, Inc., Meriden, CT (US)

( * ) Notice: Subject to any disclaimer, the term of this patent is extended or adjusted under 35 U.S.C. 154(b) by 356 days.

(21) Appl. No.: 11/883,201

(22) PCT Filed: Feb. 1, 2006

(86) PCT No.: PCT/US2006/003527
§ 371 (c)(1),
(2), (4) Date: Jul. 27, 2007

(87) PCT Pub. No.: WO2006/083952
PCT Pub. Date: Aug. 10, 2006

(65) Prior Publication Data
US 2008/0126017 A1    May 29, 2008

(51) Int. Cl.
*H03F 1/26* (2006.01)

(52) U.S. Cl. .................................................. 702/190
(58) Field of Classification Search .............. 702/190; 205/366

See application file for complete search history.

(56) References Cited

U.S. PATENT DOCUMENTS 3,665,188 A    5/1972    Gutmann
4,187,428 A  *  2/1980    Pochwalski et al. .......... 250/366

* cited by examiner

*Primary Examiner* — Drew A Dunn
*Assistant Examiner* — Xiuquin Sun
(74) *Attorney, Agent, or Firm* — David W. Carstens; Steven H. Washam; Carstens & Cahoon, LLP

(57) ABSTRACT

Methods of detecting radioactivity in dynamic situations in which radiation is detected from large and small radioactive objects with at least one radiation detector as the objects pass through the field of view and combinations are made from those measurements which are either adjacent in time, from multiple detectors, or at different energies. An elevated signal is reported when an analysis of the various combinations shows an elevated signal in anyone combination. Small amounts of radioactivity can be detected even in the presence of large amounts.

6 Claims, 1 Drawing Sheet

MAXIMUM ENTROPY SIGNAL DETECTION METHOD

TECHNICAL FIELD

The present invention relates to signal detection generally including but not limited to a novel method for detecting radioactivity in dynamic situations that is used as an example of reducing the method to practice.

BACKGROUND ART

Detecting radioactivity in dynamic situations—where the radiation signal is varying with time—is problematic, if the goal is to detect the smallest true signal, and at the same time not generate a "detection" signal if there is no signal present. This time variance of the radioactivity signal can be for many different reasons. Common ones include:

- small segments of radioactivity mixed with normal material moving down a pipe or conveyor belt past one or more fixed radiation detectors;
- radioactivity in a vehicle moving past one or more fixed radiation detectors;
- one or more radiation detectors moving past radioactive objects.

The normal method of signal analysis is to establish a noise or background level for the signal, and then compare the signal during a pre-determined time window against this background noise level, using an appropriate statistical test. And then repeat this test for the next time window; etc.

The problem with this method is to determine the most appropriate time window. If it is made too wide, or too narrow, with respect to the time-varying signal, the detection levels will be not as good as they can be. Too wide a window includes more noise than optimum, and reduces the ability to detect small sources. Too narrow a window eliminates much of the signal, and reduces the ability to detect small sources.

A similar problem occurs if there are multiple sensors viewing an object where the signal from the object is not the same as viewed by each of the detectors. This can be because the radioactivity in the object is not uniform—some of it is closer to certain detectors than to other detectors, or obscured by more attenuating material between the radioactivity and the detectors. To maximize the ability to detect small elevations of radioactivity, the signals from multiple detectors are frequently combined [e.g. summed]. The problem is to determine the most appropriate combination of detectors to allow detection of the smallest amount of radioactivity present in the object. The objective is to only combine those detectors where their signal contribution is more beneficial than the harm caused by their noise contribution. Using too many detectors includes too much background noise, and reduces the ability to detect small sources; using too few detectors eliminates useful signal, and reduces the ability to detect small sources.

These two situations can also be combined; small elements of radioactivity in an otherwise non-radioactive object or matrix that are not in known or predictable locations, and where this matrix is moving past a group of fixed detectors, each one viewing the object or matrix from a different vantage point. It is now very difficult to make an a-priori estimate of the proper time window and detector grouping for the optimum summation to allow detection of the lowest level of radioactivity.

The same situation occurs in gamma spectroscopy where the nuclide decays with several different gamma energies. Under some conditions gamma line 1 might be the best one to use; under some conditions gamma line 2 might be the best one to use; and under some other conditions the combination of line 1 and line 2 might be the best one to use.

Any of these 3 measurement conditions might be combined; multiple signal widths vs. time; multiple signals from different detectors, and multiple energy windows within a single detector during a single time interval.

Accordingly, it is a principal object of the invention to provide a method to detect a signal in dynamic situations.

Other objects of the invention, as well as particular features and advantages thereof, will be apparent or be elucidated in the following description and the accompanying drawing figures.

DISCLOSURE OF INVENTION

The present invention achieves the above objects, among others, in one aspect of the invention, comprising: a method of detecting an elevated signal, using a sequence of constant width samples from detector apparatus; summing adjacent populations of adjacent said samples from the narrowest to the widest; analyzing each of said populations to determine if said elevated signal is present when compared to background noise; and reporting said elevated signal. In a further aspect of the invention, there is provided a method of detecting an elevated signal, comprising: using measurements from each of several different detectors viewing same sample; creating various combinations of different detector measurements; creating a population sample of either all possible detector summations or a subset of physically reasonable summations; analyzing each said population sample to determine if said elevated signal is present when compared to background noise; and reporting said elevated signal. In an additional aspect of the invention, there is provided a method of detecting an elevated radiation signal, comprising: using a measurement of gamma energy from each of several different energy regions from the same radionuclide or radionuclide group within same detector measurement; creating various combinations of different energy regions within that detector measurement; creating a population of either all possible energy region summations or a subset of those physically reasonable summations; analyzing each population to determine if said elevated radiation signal is present when compared to background noise; and reporting said elevated radiation signal.

BRIEF DESCRIPTION OF DRAWINGS

Understanding of the present invention and the various aspects thereof will be facilitated by reference to the accompanying drawing figures, submitted for purposes of illustration only and not intended to define the scope of the invention, on which.

BEST MODE FOR CARRYING OUT THE INVENTION

Figure 1:
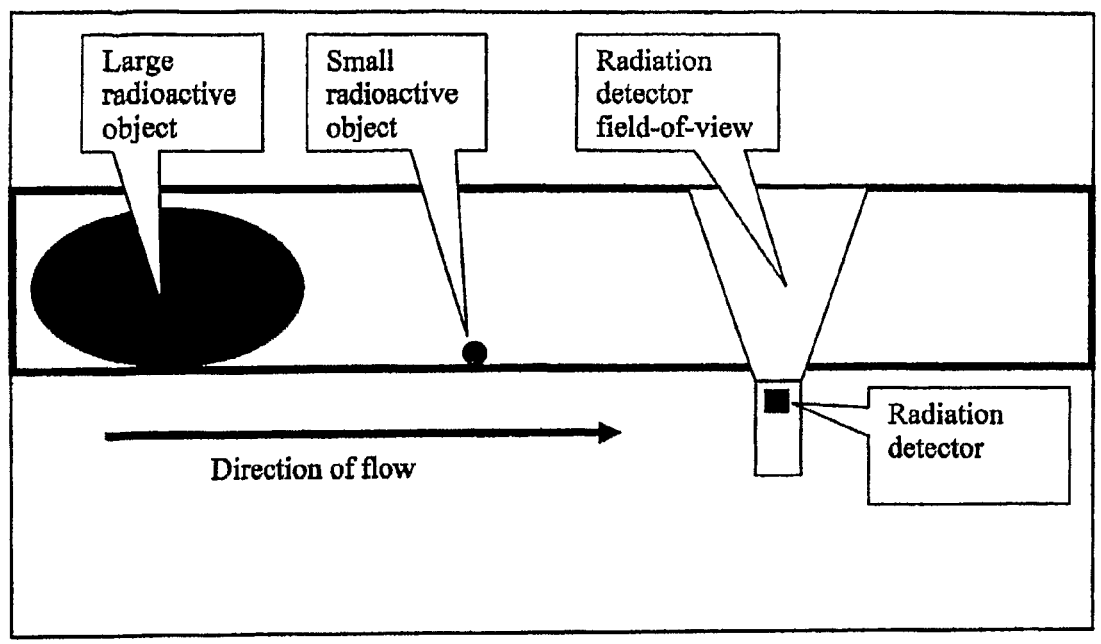
FIG. 1 is a schematic representation of large and small radioactive objects flowing past a single radiation detector.

Since an a priori understanding of what combination of sample window and detector grouping and energy window provides the optimal sensitivity is not possible, testing is conducted at all reasonable combinations of these items. Possible detector groupings, for example where 3 detectors are used, include 1; 2; 3; 1 & 2; 1 & 3; 2 & 3; and 1 & 2 & 3. A sample analysis window is established, based on the upper bound signal change rate, referred to as a Basic Interval. Analysis windows are established as integer multiples of the Basic Interval, from a single Basic Interval to the longest window made necessary by the lower bound of the signal change rate. In practice, each detector acquires units of data for Basic Intervals. In the case of spectroscopy detectors, multiple energy regions may be defined. A matrix of the combinations of detector groupings, sample windows, and energy windows is established. An appropriate statistical detection threshold is tested for each combination. As Basic Intervals of data are acquired, the matrix is refreshed with the new data and the testing is repeated. Real-time analysis requires that the matrix be sufficiently coarse to ensure testing is completed inside of a Basic Interval, although real-time analysis is not a requirement of the invention.

This invention is appropriate under the following conditions:

Where it is desired to have a high Detection Probability when the signal is truly present at very low levels and at the same time a low False Detection Probability when the signal is not present;

Where the signal in the sensor is caused by events occurring in a random manner;

Where the signal width is either variable or not well known; and

Where the signal width of the narrowest and widest signal-causing event is known or can be assumed.

Reference should now be made to the drawing figures on which similar or identical elements are given consistent identifying numerals throughout the various figures thereof, and on which parenthetical references to figure numbers, when used, direct the reader to the figure(s) on which the element(s) being described is (are) most clearly seen, although that (those) element(s) may be shown on other drawing figures also.

FIG. 1 shows one example in use. The sensor is a radiation detector. The sensor is measuring radioactivity flowing down a pipe or down a conveyor belt. The signal is caused by various sizes of radioactive objects in the pipe or on the conveyor belt.

It is obvious that the small object is in the detector field of view a short time, and will cause a signal of short time duration, whereas the large object will cause a signal of long time duration. How then to create a signal detection process to detect both types of signals in the optimum manner?

The following is an illustrative flow of the analysis process:
1. Define the Basic Interval B. This is a fraction of the time the smallest object is in the detectors field-of-view, perhaps ¼ of that time.
2. Define the time that the largest object of interest will cause a signal. This is L.
3. Start recording the total [signal plus background] value during the first B [B1] and for each interval B thereafter [Bn]
4. Compute the following for time period B1:
   a. Average signal during B1
   b. Average signal during B1+B2
   c. Average signal during B1+B2+B3
   d. Etc.
   e. Average signal during B1+B2+B3+ . . . +B(L/B)
5. For each of these L/B conditions, determine if the signal is present when compared to the appropriate background. If ANY of the individual tests shows that the signal is present, assume that it is present; otherwise it is absent. Repeat the process anew for the time period B2, where B2 becomes the new B1.
6. Report the total radiation signal received during a given time period.

Figure 2:
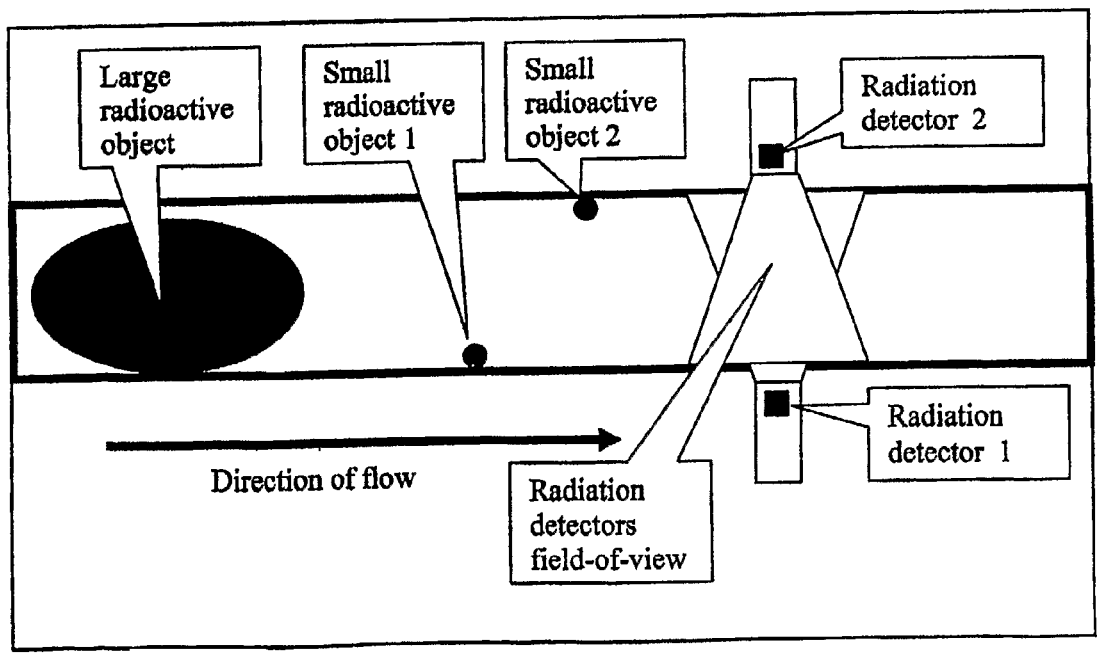
FIG. 2 is a schematic representation of large and small radioactive objects flowing past two radiation detectors.

Now consider the case where there are multiple detectors. FIG. 2 illustrates the same situation as before, except that there now are two radiation detectors and two small radioactive objects.

It is obvious that when the small object 1 is in the detector 1 field of view it will be for a short time, and will cause a signal of short time duration in detector 1. At the same time it will cause a signal of long time duration in detector 2. However since the source is closer to detector 1, the magnitude of the signal will be larger for detector 1 than for detector two. The opposite situation happens with object 2—the time duration will be short for detector 2 but long for detector 1, and the signal will be higher for detector 2 than for detector 1. If the small object were in the middle, the time durations would be the same for both detectors, and the signals might be about the same magnitude.

For small object 1, the signal from detector 2 is probably so small as to not be helpful—it would be mostly noise. Therefore, analyzing detector 2 by itself is probably the optimum method. But if the small object is in the center, of if measuring the large object, the optimum method is probably from analyzing the sum of the signals from both detectors.

The point of this exercise is that the optimum signal analysis method is not known in advance. How then to create a signal detection process to detect both types of signals in the optimum manner?

The following is an illustrative flow of the analysis process:
1. Define the Basic Interval B. This is a fraction of the time the smallest object is in the detectors field-of-view, perhaps ¼ of that time.
2. Define the time that the largest object of interest will cause a signal. This is L.
3. Start recording the total [signal plus background] value during the first B [B1] and for each interval B thereafter [Bn]. Record the value separately for detector 1 and for detector 2.
4. Compute the following for time period B1:
   a. Average signal during B1 in Detector 1
   b. Average signal during B1 in Detector 2
   c. Average signal during B1 for Detector 1+Detector 2
   d. Average signal during B1+B2 in Detector 1
   e. Average signal during B1+B2 in Detector 2
   f. Average signal during B1+B2 for Detector 1+Detector 2
   g. Average signal during B1+B2+B3 in Detector 1
   h. Average signal during B1+B2+B3 in Detector 2
   i. Average signal during B1+B2+B3 for Detector 1+Detector 2
   j. Etc.
   k. Average signal during B1+B2+B3+ . . . +B(L/B) in Detector 1
   l. Average signal during B1+B2+B3+ . . . +B(L/B) in Detector 2
   m. Average signal during B1+B2+B3+ . . . +B(L/B) for Detector 1+Detector 2
5. For each of these (L/B)×3 conditions, determine if the signal is present when compared to the appropriate background. If any of the individual tests shows that the signal is present, assume that it is present; otherwise it is absent.
6. Repeat the process anew for the time period B2, where B2 becomes the new B1.
7. Report the total radiation signal detected during a given time period.

A similar extrapolation of the method can be made when there are several possible energy regions within a particular detector.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "outer", "inwardly", "vertical", "horizontal", and the like, where used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention that, as a matter of language, might be said to fall therebetween.

The invention claimed is:

1. A radiation detection system for detecting the presence of an elevated radiation signal against background noise, the system comprising:
   at least one radiation detection device;
   a signal processing device accepting input from the radiation detection device, the processing device for generating a signal in response to detection by the at least one radiation detection device of a signal-causing event, the processing device performing the processing steps comprising:
      obtaining a sequence of constant interval measurements from the at least one radiation detection device;
      obtaining average signal strengths by summing adjacent groupings of said constant interval measurements, from a small number of adjacent measurements in the group to a large number of measurements in the group;
      analyzing each of said average signal strengths to determine if said elevated signal is present when compared to background noise; and
      reporting the presence of said elevated signal.

2. The radiation detection system of claim 1, the detection system further comprising a plurality of radiation detection devices, wherein the signal processing steps further comprise:
   using measurements from each of the plurality of detection devices viewing a common radioactive object;
   creating various combinations of different detection device measurements; and
   creating a population sample of either all possible detection device summations or a subset of physically reasonable summations.

3. The radiation detection system of claim 1, wherein the signal processing steps further comprise:
   using a measurement of gamma energy from each of several different energy regions from a common radionuclide or radionuclide group within the detection device measurement;
   creating various combinations of different energy regions within the detection device measurement;
   creating a population of either all possible energy region summations or a subset of physically reasonable summations.

4. A computer software program tangibly embodied in a computer readable medium, the program including machine-readable instructions executable by a computer processor to perform a method for detecting the presence of an elevated radiation signal against background noise, the program steps comprising:
   obtaining a sequence of constant interval measurements from at least one radiation detection device;
   obtaining average signal strengths by summing adjacent groupings of said constant interval measurements, from a small number of adjacent measurements in the group to a large number of measurements in the group;
   analyzing each of said average signal strengths to determine if said elevated signal is present when compared to background noise; and
   reporting the presence of said elevated signal.

5. The computer software program of claim 4, the program steps further comprising:
   using measurements from a plurality of detection devices viewing a common radioactive object;
   creating various combinations of different detection device measurements; and
   creating a population sample of either all possible detection device summations or a subset of physically reasonable summations.

6. The computer software program of claim 4, the program steps further comprising:
   using a measurement of gamma energy from each of several different energy regions from a common radionuclide or radionuclide group within the detection device measurement;
   creating various combinations of different energy regions within the detection device measurement; and
   creating a population of either all possible energy region summations or a subset of physically reasonable summations.

* * * * *